O. O. NORBY.
QUACK GRASS DIGGER.
APPLICATION FILED AUG. 6, 1917.
1,268,992.
Patented June 11, 1918.
2 SHEETS—SHEET 2.
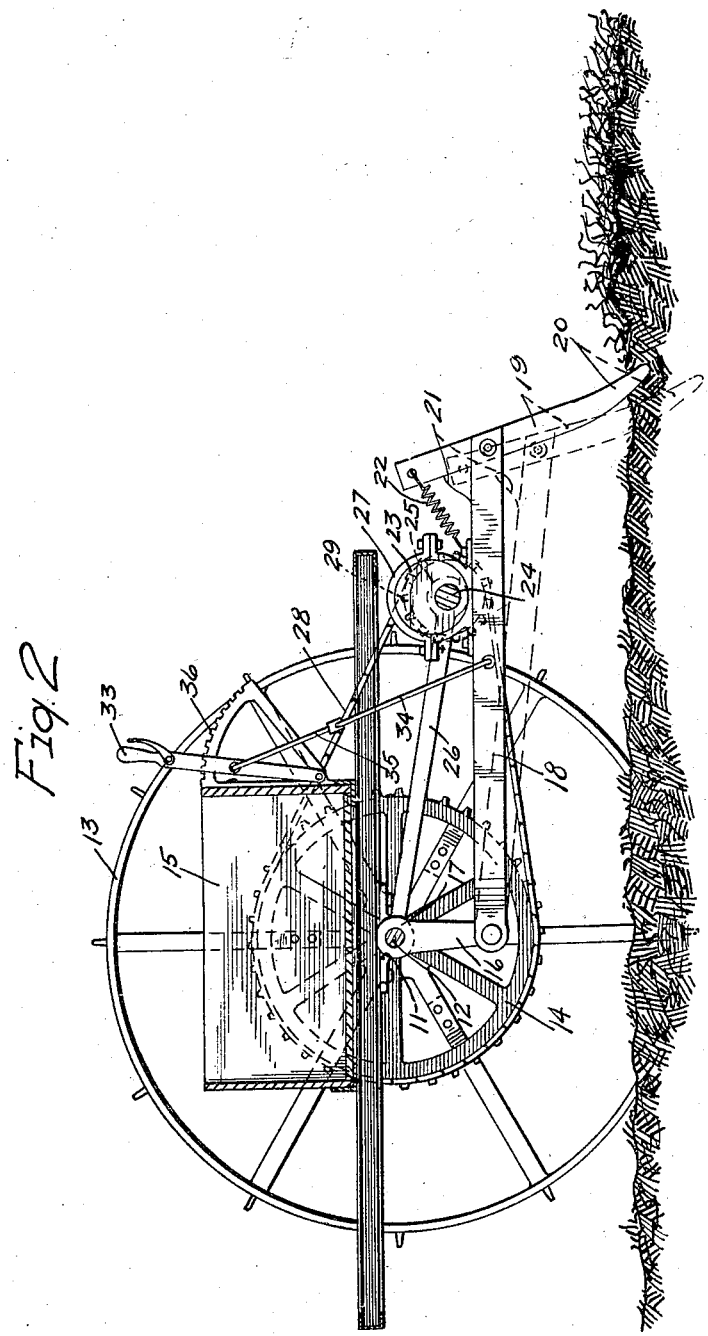
WITNESSES
E. E. Wells
H. L. Opsahl
INVENTOR
Olaus O. Norby
BY HIS ATTORNEYS
Williamson Merchant

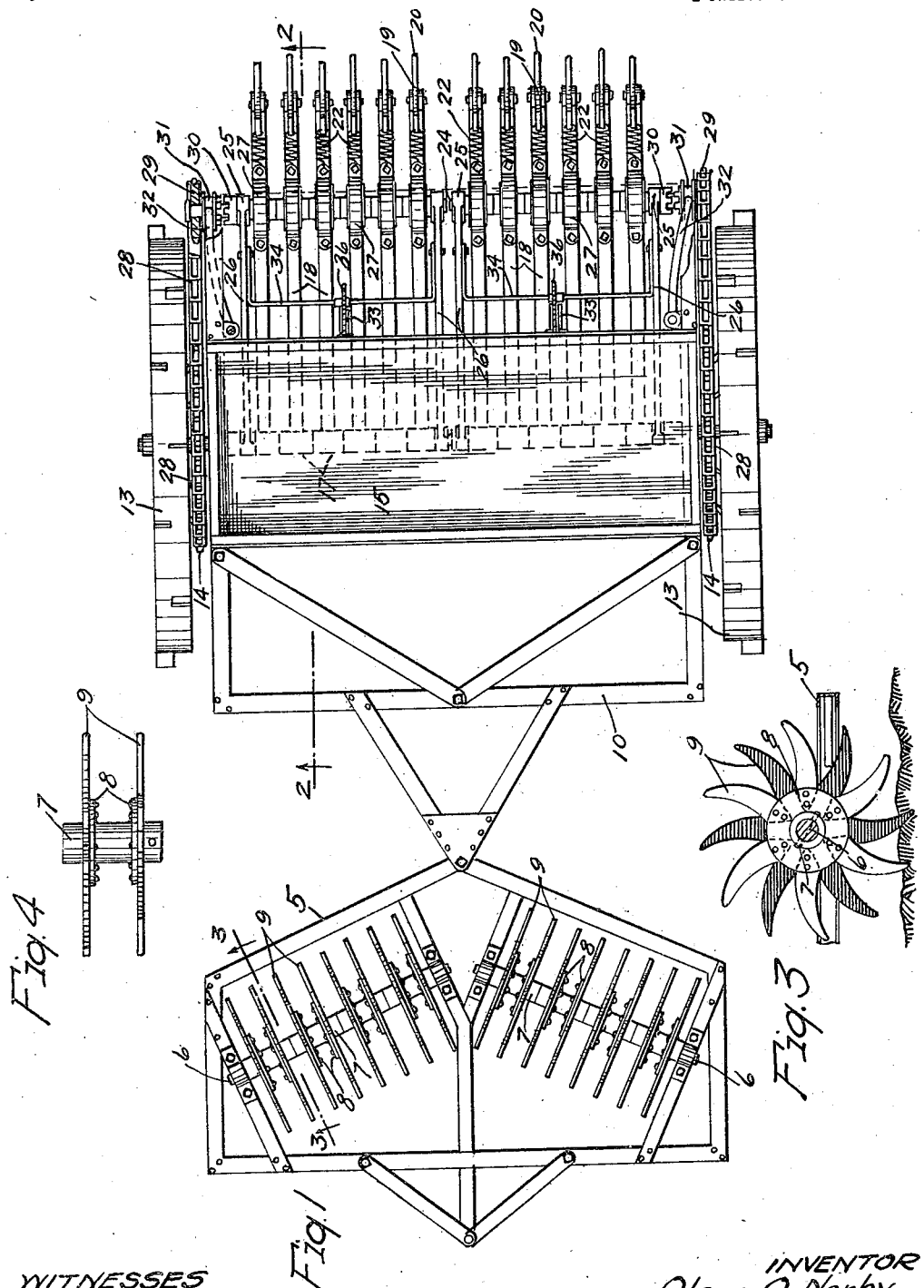

UNITED STATES PATENT OFFICE.

OLAUS O. NORBY, OF DETROIT, MINNESOTA.

QUACK-GRASS DIGGER.

1,268,992.

Specification of Letters Patent.  Patented June 11, 1918.

Application filed August 6, 1917. Serial No. 184,740.

*To all whom it may concern:*

Be it known that I, OLAUS O. NORBY, a citizen of the United States, residing at Detroit, in the county of Becker and State of Minnesota, have invented certain new and useful Improvements in Quack-Grass Diggers; and I do hereby declare the following to be a full, clear, and exact description of the invention, such as will enable others skilled in the art to which it appertains to make and use the same.

My invention has for its object to provide an improved machine for digging quack grass; and, to this end, it consists of novel devices and combinations of devices hereinafter described and defined in claims.

As is well known, ordinary ground-working tools used on farms, such as cultivators, will not destroy quack grass, but, on the other hand, will scatter the same over the field, where it will take root, and as the same grows very profusely, valuable farm lands are very often rendered practically worthless. The object of my invention is to dig up this quack grass and deposit the same on top of the ground, where it is either left to be killed by the sun or raked up and destroyed.

In accompanying drawings, which illustrate the invention, like characters indicate like parts thoughout the several views.

Referring to the drawings:

Figure 1 is a plan view of the improved machine in its preferred form;

Fig. 2 is a view in vertical section taken on the line 2—2 of Fig. 1, with some parts removed;

Fig. 3 is a detail view with some parts sectioned on the line 3—3 of Fig. 1; and Fig. 4 is a plan view of one pair of the toothed disks removed from the harrow.

The numeral 5 indicates a harrow frame having journaled therein two horizontal shafts 6 set at an angle to each other so that their inner ends converge. Telescoped onto each shaft 6 is a plurality of cylindrical body members 7, each of which has two axially spaced disks 8. To each of these disks 8 is riveted a plurality of circumferentially spaced curved teeth 9. By reference to Fig. 3 it will be noted that one set of teeth 9 on each body member 7 is set in advance of the other set thereon.

Pivoted to the rear end of the harrow frame 5 for angular steering movement is a frame 10 having on its side members, bearings 11, in which is mounted an axle 12, having journaled on its outer ends a pair of large traction wheels 13. To each traction wheel 13 is secured for rotation therewith a large sprocket wheel 14. Balanced on the frame 10 directly over the axle 12 is a weight box 15 in which may be placed stones or other heavy objects to give the machine the desired weight. Loosely pivoted on the shaft 12 is a multiplicity of depending arms 16, having hubs 17 which hold said arms laterally spaced, the proper distance apart. To the lower end of each arm 16 is pivoted the forward end of a rearwardly extended tedder-bar 18, and to the rear end of which tedder bar is intermediately pivoted a tedder lever 19, the lower end of which is curved to form a tooth 20. Stops 21 on the tedder bars 18 are engaged by the upper end portions of the tedder levers 19 to hold the same in forwardly inclined positions, as best shown in Fig. 2. Coiled springs 22 are anchored to the upper end of the tedder levers 19 and to the tedder bars 18 for yieldingly holding said tedder levers against the stops 21.

The tedder bars 18 are raised and lowered and reciprocated endwise to move the teeth 20 into and out of the ground and horizontally therethrough by a plurality of eccentrics 23 keyed to a pair of axially alined shafts 24, each of which has its end journaled in the rear ends of a pair of links 25, pivoted to the axle 12 for vertical swinging movement. The shafts 24 and arms 26—to which they are journaled—separate the tedder bars 18 in two groups. As shown, the eccentrics 23 are located in the same vertical planes with the tedder bars 18 and connected thereto by coöperating eccentric straps 27 bolted to said tedder bars.

The shafts 24 are independently driven from the traction wheels 13 by sprocket chains 28 arranged to run over relatively small sprocket wheels 29, loosely mounted on the outer ends of said shafts and over the sprocket wheels 14. Clutches 30 are provided for connecting the shafts 24 to the sprocket wheels 29, and the movable members of said clutches have shipper collars 31, which are engaged by shipper levers 32, mounted on the frame 10.

The tedder bars 18 of each group are connected by their respective shafts 24, and each of these groups may be independently raised and lowered by latch levers 33, and connections comprising a bail 34 and a link 35. The levers 33 are pivoted to coöperating notched segments 36, secured to the weight box 15, and the ends of the bails 34 are pivoted to the intermediate portions of the end members of the groups of tedder bars 18 and have their transverse portions connected by the links 35 to the intermediate portions of the levers 33. Obviously, by operating the levers 33, the depth to which the tedder teeth 20 will enter the ground may be varied at will.

The above described machine may be drawn either by draft animals or a tractor, and, under the advance movement thereof, the ground will be thoroughly pulverized and the quack grass torn loose by the toothed disks. Following the toothed disks are the tedder teeth 20 which enter the ground and then move backward therethrough to lift the quack grass and throw the same on top of the ground. The eccentrics 23 of each group are set one in advance of the other so that the tedder teeth 20 successively follow each other in their entrance into the ground and movement therethrough. In case one of the tedder teeth 20 strikes a stone or other obstruction, the respective spring 22 will yield to prevent said tedder finger or connected portion of the machine from being broken or otherwise damaged. In some conditions of the soil, it might be possible to use only the rear portion of the machine for digging up the quack grass, in which case, the harrow section will be detached. It is also evident that the harrow section may be used independently of the remaining portion of the machine when needed in preparing the soil for seeding.

What I claim is:

1. The combination with a wheel-supported frame, of a plurality of laterally-spaced tedder bars pivotally connected to the frame, with freedom for endwise reciprocating movement, cranks for operating the tedder bars, tedder levers intermediately pivoted to the tedder bars and having toothed lower ends, springs yieldingly holding the tedder levers in operative positions, and means for operating the cranks.

2. The combination with a wheel-supported frame, of a plurality of laterally-spaced tedder bars pivotally connected to the frame, with freedom for endwise reciprocating movement, cranks for operating the tedder bars, tedder levers intermediately pivoted to the tedder bars and having on their lower ends depending rearwardly curved teeth, stops for limiting the forward movement of the upper ends of the tedder levers and for holding said levers in forwardly inclined positions, springs for yieldingly holding the tedder levers against said stops, and means for operating the cranks.

3. The combination with a wheel-supported frame, of a plurality of laterally-spaced tedder bars, connected to the frame, with freedom for endwise reciprocating movement, a shaft, vertical swinging links connecting the shaft to the frame, eccentrics on the shaft and coöperating eccentric straps on the tedder bars for operating the same, tedder levers on the free ends of the tedder bars, means for raising and lowering the shaft, and means for driving the shaft.

4. The combination with a frame, an axle on which said frame is supported, and traction wheels journaled on the axle, of depending arms loosely pivoted on the axle, laterally-spaced tedder bars having their forward ends pivoted to the free ends of the arms, tedder levers on the rear ends of the tedder bars, a horizontal shaft, a pair of links connecting the shaft to the axle, eccentrics on this shaft, and coöperating eccentric straps on the tedder bars for operating the same, and connections from the traction wheels to the shaft for driving the same therefrom.

In testimony whereof I affix my signature in presence of two witnesses.

OLAUS O. NORBY.

Witnesses:
T. J. Scott,
Alden Pearson.

Copies of this patent may be obtained for five cents each, by addressing the "Commissioner of Patents, Washington, D. C."